United States Patent
Rickard et al.

[15] 3,690,765
[45] Sept. 12, 1972

[54] APPARATUS FOR ADVANCING UNPRINTABLE NEGATIVES THROUGH PHOTOGRAPHIC PRINTERS

[72] Inventors: Robert K. Rickard; William C. Klein, both of Rochester, N.Y. 14650

[73] Assignee: Eastman Kodak Company

[22] Filed: April 13, 1971

[21] Appl. No.: 133,649

[52] U.S. Cl. ..................355/97, 355/68, 355/83, 356/202
[51] Int. Cl. .............................................G03b 27/04
[58] Field of Search ....355/97, 83, 103, 68; 356/202, 356/203

[56] References Cited

UNITED STATES PATENTS 3,168,860  2/1965  Clerk et al. ............355/103 X
3,479,119  11/1969  Miller et al. ............355/83 X Primary Examiner—Samuel S. Matthews
Assistant Examiner—Richard L. Moses
Attorney—W. H. J. Kline and Joseph F. Breimayer

[57] ABSTRACT

Apparatus responsive to the detected density of a plurality of peripheral background areas of a negative and the central area of a negative determines whether the negative is suitable for producing an acceptable print and whether classification correction is necessary in printing the negative. Over-exposed or fogged negatives and under-exposed or blank negatives are detected by a comparison of the peripheral and central area density with reference densities to generate an unprintable negative signal. A splice signal is also generated upon the detection of a splice connecting negative strips. Apparatus responsive to the unprintable negative signal and the splice signal advances unprintable negatives or negatives otherwise unsuitable for producing acceptable prints and splices, respectively, through the printing station of the printer without printing the negative or the splice. However, if all negatives in a negative strip are determined to be unprintable, the last unprintable negative is printed so that an order sort mark may be placed on the print to keep the group of prints in each customer's order coordinated with its respective negative filmstrip.

If the negative is determined to be printable, the densities of the central and peripheral areas of the negative are compared to each other in a predetermined manner to determine if the negative exhibits an unequal distribution in density indicating a subject failure. Apparatus is provided to activate classification correction factors provided on the printer in response to the classification of the negative.

24 Claims, 8 Drawing Figures

Patented Sept. 12, 1972

ROBERT K. RICKARD
WILLIAM C. KLEIN
INVENTORS

BY Joseph F. Breimayer

H. H. J. Kline
ATTORNEYS

Patented Sept. 12, 1972

ROBERT K. RICKARD
WILLIAM C. KLEIN
INVENTORS

BY Joseph F. Breumayer
W. H. J. Kline
ATTORNEYS

ROBERT K. RICKARD
WILLIAM C. KLEIN
INVENTORS

BY Joseph F. Breimayer
W. J. Kline
ATTORNEYS

Patented Sept. 12, 1972

ROBERT K. RICKARD
WILLIAM C. KLEIN
INVENTORS

BY Joseph F. Breimayer
W. H. J. Kline
ATTORNEYS

APPARATUS FOR ADVANCING UNPRINTABLE NEGATIVES THROUGH PHOTOGRAPHIC PRINTERS

CROSS-REFERENCE TO RELATED APPLICATION

Reference is made to commonly assigned, copending U.S. application, Ser. No. 67,331, entitled Method And Apparatus For Sensing Radiation Derived From Information Bearing Media, filed in the names of Robert W. Huboi, Osmond F. Palmer and Edward M. Waz on Aug. 27, 1970.

BACKGROUND OF THE INVENTION

1. Field of the Invention

This invention relates to photographic apparatus, and more particularly to apparatus for advancing unprintable photographic negatives or negatives otherwise unsuitable for producing acceptable prints and filmstrip splices through a photographic printer without printing them and for classifying a printable photographic negative in accordance with its density modulation.

2. Description of the Prior Art

As is well-known in the prior art, machines conventionally referred to as printers or printing machines are used to project a light image of a photographic original upon a sensitized sheet of photographic printing paper to produce a positive print from the photographic original or negative. Such printers usually contain means for measuring the brightness of each photographic original and for automatically controlling the exposure of the sheet of photographic paper accordingly. For example, subtractive color printers of the type shown in commonly assigned U.S. Pat. No. 3,184,307 include red, green and blue color sensitive monitors that are provided to measure the red, green and blue light in the printing beam transmitted by the original. The integrated transmittance measurements are converted into large area transmission density (LATD) signals that are applied to timing circuits which control the insertion of corresponding subtractive color filters into the printing beam to terminate the exposure of the photographic print material to each respective color. Furthermore, the LATD measurement systems and subtractive color filters are normally interconnected so as to mix the transmission signals and thereby reduce the color correction level of the LATD measurement system. Photographic printers operating under the principles of the LATD measurement system normally include variable color correction level adjustments which are set to maximize the number of color balanced prints obtainable from an average population of negatives.

Guided by the measurement of the total integrated transmittance of each negative by the LATD system, very satisfactory prints may be obtained from a large number of negatives on the first printing. However, the average population of negatives submitted for printing contains a significant number of negatives that are not printable that is, are not suitable for producing acceptable prints, such as grossly over-exposed or fogged negatives and under-exposed or blank negatives which result from errors in exposure or improper film handling. Furthermore, a significant number of negatives may be unacceptable due to an abnormality in the illumination of the negative known in the art as "subject failure." Two extreme, but frequently occurring, examples of negatives exhibiting subject failure are a single flash exposure of a child against a dark background and another picture of a child against a background of snow. It is not unreasonable to expect that the child, in both cases may require the same printing exposure. The integrated light flux transmitted by the negative, as the LATD measuring photocells see it, in the single flash picture, shows a very large amount of light transmitted by the very light area surrounding the child in the negative. However, a very small amount of light is transmitted by the dense background area of the back-lit snow scene negative. When the total light transmittance of these two negatives is integrated, the effect of the density of the background areas of each negative biases the LATD measurement resulting in under-exposed and over-exposed prints, respectively.

These problems are well-known and recognized in black and white and color printing. After some experience, a good printer operator immediately recognizes and bypasses unprintable negatives and comes to recognize a subject failure problem from inspection of the negatives, and corrects his exposure for subject failure as part of the first printing operation. In production type photofinisher printing, this correction is known as subject classification and has been reduced, as an operation, to the simple pressing of a proper classification button provided by the manufacturer of the printer which alters the exposure time that would normally be determined by the LATD measurement system.

Despite this assessment of the negative by a skilled person, it is still necessary to view the resultant prints in order to eliminate unsatisfactory prints and to repeat the exposure of the corresponding negatives at corrected exposure times. For this reason and in order to increase the speed of the printing operation, many photofinishers have resorted to the practice of setting the color correction to an optimum level and having the printer continuously print all negatives at the highest attainable speed without inspection by an operator. Thereafter, unsatisfactory prints and their corresponding negatives are determined by a print inspector who calculates, if the negative is printable, the proper subject classification. The subject classification may be recorded on the unsatisfactory print or elsewhere and reprinted by an operator on a further printer.

The process outlined above is considerably inefficient in view of the number of unacceptable prints that are produced during the first printing operation. Many proposals have already been made to improve and complete the automation of the process of printing color negatives and to simplify the procedure. It has already been proposed for example to automatically pick out the negatives that are unsuitable for printing and to omit these during first printing process. See for example U.S. Pat. No. 3,516,741 entitled Apparatus For Making Prints From Color Negatives.

It has also been proposed in U.S. Pat. No. 3,537,790, entitled Negative Feeder For Photographic Printer, to provide as an attachment, an automatic negative feeder for advancing a continuous strip of negatives past an opening in the table of a standard printer including a viewing station which allows the operator to view the film before it is printed, and to provide automatic means for inactivating the printer when over-exposed or under-exposed prints are detected. In addition automatic means are included to sense a splice between adjacent strips of the filmstrip and to place a mark on the photographic paper in the printer so that an end of order can be sensed by automatic equipment used to sever the pictures of each order.

Such apparatus known in the prior art does not provide for subject classification of printable photographic negatives, an operation which has normally required the skill and judgment of an operator viewing the negative.

SUMMARY OF THE INVENTION

Accordingly, it is an object of our invention to increase the number of satisfactory prints produced by an operatorless photographic printer.

Another object of our invention is to provide an operatorless classification of photographic negatives in accordance with the density modulation of the negative.

It is a further object of the invention to automatically classify a negative in accordance with its measured density variations and to provide corresponding direction signals for the exposure control system of a photographic printer.

It is still another object of the invention to determine if a negative is unprintable and to advance unprintable negatives through the printing station of the printer without printing them.

Another object of the invention is to detect splices connecting negative filmstrips and to prevent the exposure in the printing station of such splices.

It is still another object of this invention to print one negative or original that is unsuitable for producing an acceptable print between splices whenever all the negatives between the splices are suitable for producing acceptable prints.

A preferred embodiment of the present invention is disclosed in connection with a photographic printer which comprises first and second radiation sensitive means responsive to the radiation transmittance of first and second respective areas of an information bearing medium, such as a photographic original, for producing corresponding first and second signals, each of the first and second signals having an amplitude dependent upon the radiation transmittance (corresponding to and dependent upon density modification of a photographic original) of each respective areas of said information bearing medium. Means responsive to first and second reference signals having first and second reference amplitudes and to the amplitudes of the first and second signals provide first and second unprintable signals. More particularly, the first and second reference amplitudes are indicative of the maximum and minimum transmittances, respectively, of a photographic original that can be successfully printed to produce an acceptable print. The first unprintable signal is produced when the amplitudes of the first and second signals exceed the first reference amplitude, and the second unprintable signal is produced when the second reference amplitude exceeds the amplitudes of the first and second signals. Means respond to the first and second unprintable signals to prevent the printing of the photographic original.

Further apparatus responsive to the relative amplitudes of the first signals produce classification signals for controlling the exposure of photographic originals that are determined to be printable. Apparatus responsive to splices, and the absence of any photographic original that is suitable for producing an acceptable print in a photographic original filmstrip provide for the printing of at least one photographic original in such as filmstrip to separate customer order prints.

The method of operation of the apparatus of the preferred embodiment of the invention in the modes to be described hereinafter advantageously reduces the number of faulty prints produced by an operatorless photographic printer.

Other objects and advantages of the invention will become more apparent from the following description taken in conjunction with the accompanying drawings.

BRIEF DESCRIPTION OF THE DRAWINGS

In the detailed description of the preferred embodiment of the invention presented below, reference is made to the accompanying drawings, in which.

DESCRIPTION OF THE PREFERRED EMBODIMENT

Figure 1:
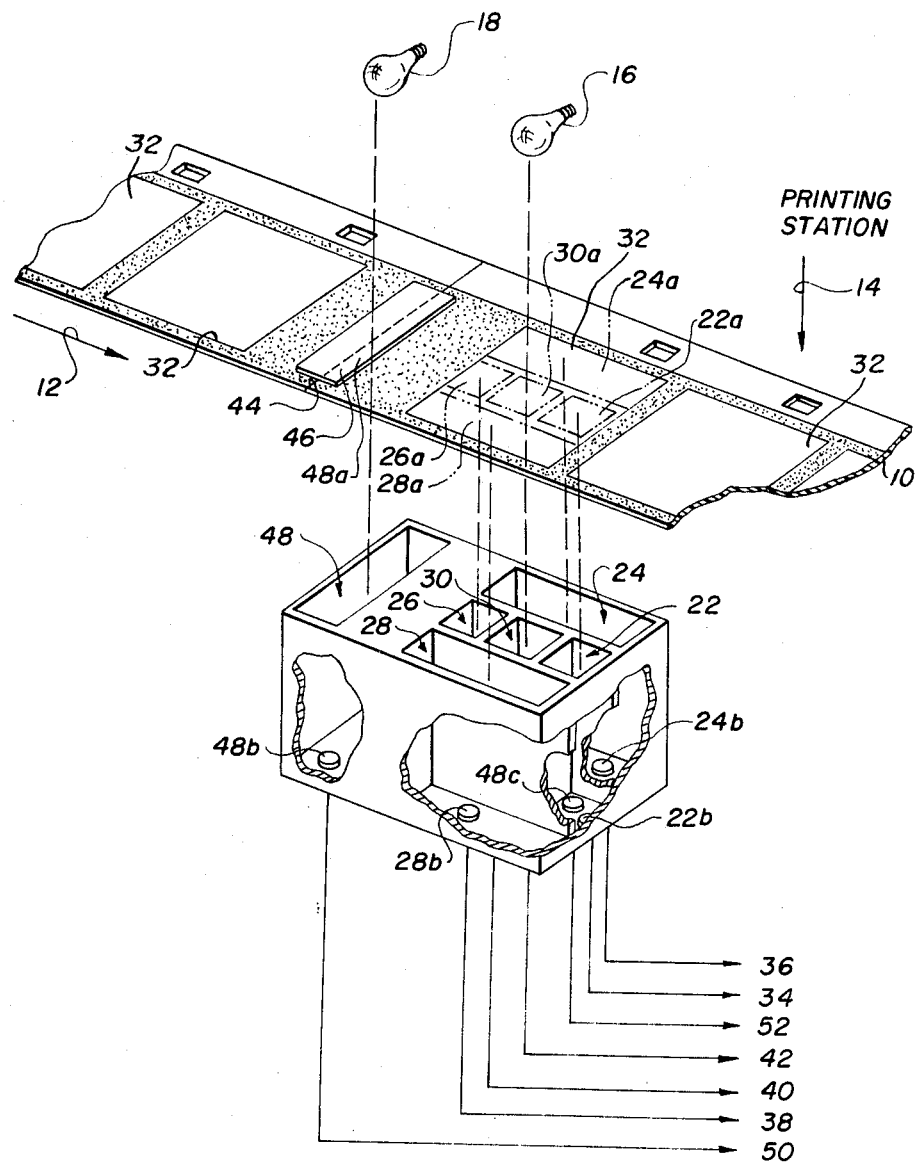
FIG. 1 is a perspective view showing the location of splice detection and negative density determining photosensitive devices located with respect to a negative filmstrip.

Referring now to the drawings and first to FIG. 1 there is shown a perspective view of an array of photosensitive devices situated with respect to a negative filmstrip 10 to produce a plurality of density signals and a first and second splice detection signal in accordance with the teachings of the present invention. The negative filmstrip 10 advances left to right in the direction of the arrow 12 from a supply reel (not shown) through the printing station 14 of a printer and to a take-up reel (not shown). The model 2620 color printer manufactured and sold by Eastman Kodak Company constitutes one type of printer that is provided with apparatus for intermittently advancing and printing negative filmstrips of a customer's order that have been spliced together and wound upon a supply reel after processing of the filmstrips. Such a printer is normally provided with a viewing station at which an operator inspects the negative to be printed, determines if it is printable, and classifies the negative. The printer is provided with a series of classification correction factors which may be selectively employed to modify the LATD measurement output signal to correct for subject failures perceived by the printer operator. Closing the switch contact to call for one of these factors also initiates the printing of the negative. It will be understood that the terms "printable" and "unprintable" refer to conditions of the detected densities in each of the measured areas of the negative that indicate that the negative is suitable or unsuitable, respectively, for producing an acceptable print. A negative determined to be "unprintable" because it is too under-exposed or blank or over-exposed or fogged, may be "printed" in the printer but would result in an unacceptable print.

In accordance with the teachings of the present invention, the operation of an existing printer may be modified by the addition of the apparatus shown in FIG. 1 and the circuitry of FIGS. 2–5 to eliminate the necessity of an operator for the machine. In FIG. 1, a first and a second light source 16 and 18, respectively, are arranged to direct light through the negative filmstrip 10 and upon a plurality of photosensitive devices arranged in a predetermined array in a compartmented housing 20. The compartmented housing 20 and the first and second light sources 16 and 18 are located in a negative examination station at least one negative distance away from the printing station 14 of the printer.

The compartmented housing 20 contains five cellular chambers 22, 24, 26, 28 and 30, that have a combined dimension along the negative filmstrip 10 equivalent to the dimensions of each negative 32 of the filmstrip 10. The chambers 22, 24, 26 and 28 of the housing 20 are arranged so that light from light source 16 passes through respective peripheral areas 22a, 24a, 26a and 28a of the negative 32 and onto respective photosensitive devices 22b, 24b, 26b (not shown) and 28b. Thus the light transmitted by four peripheral areas of the negative 32 is measured by the photosensitive devices 22b, 24b, 26b and 28b.

The fifth chamber 30 of the housing 20 contains a fifth photosensitive device 30b (not shown) which is responsive to light from light source 16 transmitted by the central area 30a of the negative 32. Electrical conductors 34, 36, 38, 40 and 42 are connected to the photosensitive device 22b, 24b, 26b, 28b and 30b, respectively.

The negative filmstrip 10 consists of a number of individual customer orders spliced together as shown, for example, at 44 by an opaque splice 46 which extends almost completely across the width of the negative filmstrip 10. The housing 20 contains a sixth chamber 48 having a shape corresponding to the perimeter 48a of the splice 46 and located within one negative frame distance from the first five chambers in the housing 20. Located within the sixth chamber 48 is a first splice detecting photosensitive device 48b that is sensitive to the light from light source 18 transmitted by the negative filmstrip 10 to produce a first signal on the conductor 50. A second splice detecting photosensor 48c is located within the first chamber 22 and is responsive to light from light source 16 transmitted by the negative filmstrip 10 to produce a second signal on conductor 52.

The splice 46 is opaque, and, in the position of the negative filmstrip 10 shown in FIG. 1, absorbs light emitted by light source 18 and prevents it from falling into chamber 48 and upon the first splice detecting photosensitive device 48b. Therefore, in the presence of a splice 46, the light detecting photosensitive device 48b does not produce an output signal on the conductor 50. As the negative filmstrip 10 advances in the direction of the arrow 12, the splice 46 will also absorb light emitted by light source 16 and prevent light from falling upon the second splice detecting photosensitive device 48c. Thus, the splice 46 is detected by two separate splice detecting photosensitive devices that produce two separate splice signals on conductors 50 and 52.

Thus the negative 32 is uniformly illuminated by the light source 16, and the photosensitive devices in each of the five chambers measure the transmission of each respective area of the negative covering each respective chamber. The particular arrangement of the chambers and their total number are selected so that negatives exhibiting a subject failure due to backlighting or front-lighting of the scene may be readily ascertained by a comparison of the negative transmittances of each area. If only a single photosensitive device looking at the entire area of the negative were employed or a number of separate photosensitive devices looking at the entire area of the negative were employed, unprintable negative detection and subject classification of such a subject failure negative would be difficult.

Figure 2:
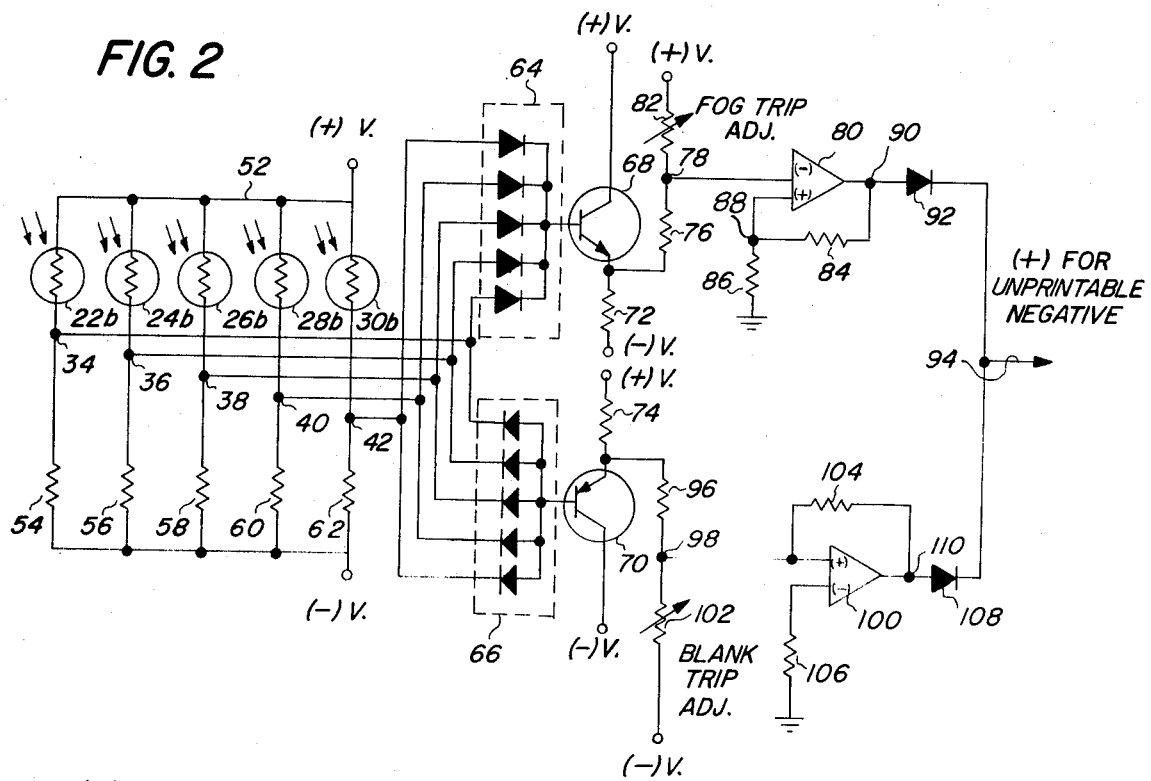
FIG. 2 is a schematic illustration of an electrical circuit for detecting an unprintable negative.

Referring now to FIG. 2 there is shown a circuit for the unprintable negative detector that responds to the output signals of the photosensitive devices of FIG. 1 to determine if a negative is printable. The photosensitive devices 22b, 24b, 26b, 28b and 30b are electrically connected in parallel between a source of positive voltage +V and a source of negative voltage −V through resistors 54, 56, 58, 60 and 62 and are respectively connected to the output conductors 34, 36, 38, 40 and 42. The output conductors 34, 36, 38, 40 and 42 are connected in parallel to the anodes of gating diodes 64 and the cathodes of gating diodes 66, respectively. The cathodes of gating diodes 64 and the anodes of diodes 66 are commonly connected to the base electrodes of transistors 68 and 70. The NPN transistor 68 is connected at its collector electrode to a source of positive voltage +V and at its emitter electrode to one terminal of a resistor 72, the other terminal of which is connected to a negative voltage source −V. Similarly, the collector terminal of PNP transistor 70 is connected to a negative voltage source −V, and the emitter terminal of transistor 70 is connected to one terminal of resistor 74, the other terminal of which is connected to a positive voltage source +V.

As shown in FIG. 1 each of the photosensitive devices 22b, 24b, 26b, 28b and 30b are responsive to light transmitted by predetermined areas of the negative 32. As shown in FIG. 2 the voltage on output conductors 34, 36, 38, 40 and 42, respectively, is directly dependent upon the amount of light striking each respective photosensitive device. These voltage levels are transmitted by the gating diodes 64 and 66 to the base electrodes of the transistors 68 and 70, respectively. The output voltage developed at the emitter terminal of the transistor 68, which operates as an emitter-follower, corresponds to the highest voltage of the voltage levels on the conductors 34, 36, 38, 40 and 42. This voltage signal developed at the emitter terminal of transistor 68 is conducted by resistor 76 to the negative input terminal 78 of amplifier 80. A source of positive voltage +V is also applied by variable resistor 82 to the negative input terminal 78 of the differential amplifier 80. A feedback network consisting of resistors 84 and 86 connect the positive input terminal 88 of the amplifier 80 with the output terminal 90 of amplifier 80. The positive feedback stabilizes the operation of the amplifier 80, and isolation diode 92 is connected at its anode terminal to the output terminal 90 and at its cathode terminal to the common output terminal 94.

The resistor 76 and the variable resistor 82 act as b, voltage divider with respect to the positive voltage source +V and the output signal developed at the emitter terminal of transistor 68. As stated hereinbefore the transistor 68 operates as an emitter-follower amplifier the output of which corresponds in magnitude to the least negative signal developed by the photosensitive devices 22b, 24b, 26b, 28b and 30b. If a low amount of light is transmitted by the negative 32 upon all of the photosensitive devices 22b, 24b, 26b, 28b and 30b, *the output signal of the emitter-follower amplifier is relatively negative.*

The resistor 76, the variable resistor 82, the positive voltage source +V and the amplifier 80 operate as a voltage comparator which produces a positive output signal at output terminal 90 when the magnitude of the least negative signal developed by the photosensitive devices is less than the positive voltage provided by the setting of the variable resistor 82. The development of a positive voltage output signal at output terminal 90 indicates that the negative being examined is so dense that it is unprintable due to gross over-exposure or fogging of the negative. The adjustment of the variable resistor 82 determines the level at which the negative is considered unprintable.

Similarly the output signal developed at the emitter terminal of PNP transistor 70 is conducted by resistor 96 to the positive input terminal 98 of a second amplifier 100. A negative voltage source −V is also applied by a variable resistor 102 to the positive input terminal 98. Resistors 104 and 106 are also provided to stabilize the operation of the amplifier 100. A further isolation diode 108 is connected at its anode terminal to the output terminal 110 of amplifier 100 and at its cathode terminal to the common output terminal 94 of the unprintable negative detecting circuit.

The transistor 70 also operates as an emitter-follower that produces an output signal at its emitter terminal that corresponds to the least positive of the voltages generated by the photosensitive devices 22b, 24b, 26b, 28b and 30b. This output signal is compared to the reference signal provided by the negative voltage source −V and the variable resistor 102. When the negative being examined is highly transmissive of light through all areas of the negative, the voltage signals developed at the cathodes of gating diodes 66 are positive in sign and relatively large. If all the photosensitive devices are sufficiently illuminated, the output signal of transistor 70 is sufficiently positive with respect to the negative reference signal level to provide a positive voltage signal at the input terminal 98 of the amplifier 100. Amplifier 100 responds to a positive input voltage signal to produce a positive output signal at its output terminal 110. When such a positive output signal is developed, the negative being examined is considered to be unprintable due to a blank negative or a grossly underexposed negative. The level of under-exposure at which an output signal is developed at output terminal 110 may be controlled by the setting of the variable resistor 102.

The output signals of the two comparator circuits are transmitted to common point 94 by the isolation diodes 92 and 108. To summarize the operation of the circuit, fogged or over-exposed negatives cause the production of a positive output signal at the output terminal 90, and blank or under-exposed negatives cause the production of a positive output signal at output terminal 110. Printable negatives cause neither output signal. Furthermore all five photosensitive devices 22b, 24b, 26b, 28b and 30b have to be relatively non-conductive before an output signal can be developed at the point 90 or have to be highly conductive before the output signal is produced at the output terminal 110. If any one of the five photosensitive devices generates a voltage level falling between the voltage level set by the variable resistors 82 and 102 (indicating some discernible subject matter on the negative frame), neither output signals can be generated. The provision of the five photosensitive devices operating independently in parallel insures that printable subject failure negatives can be distinguished from unprintable negatives.

Figure 3:
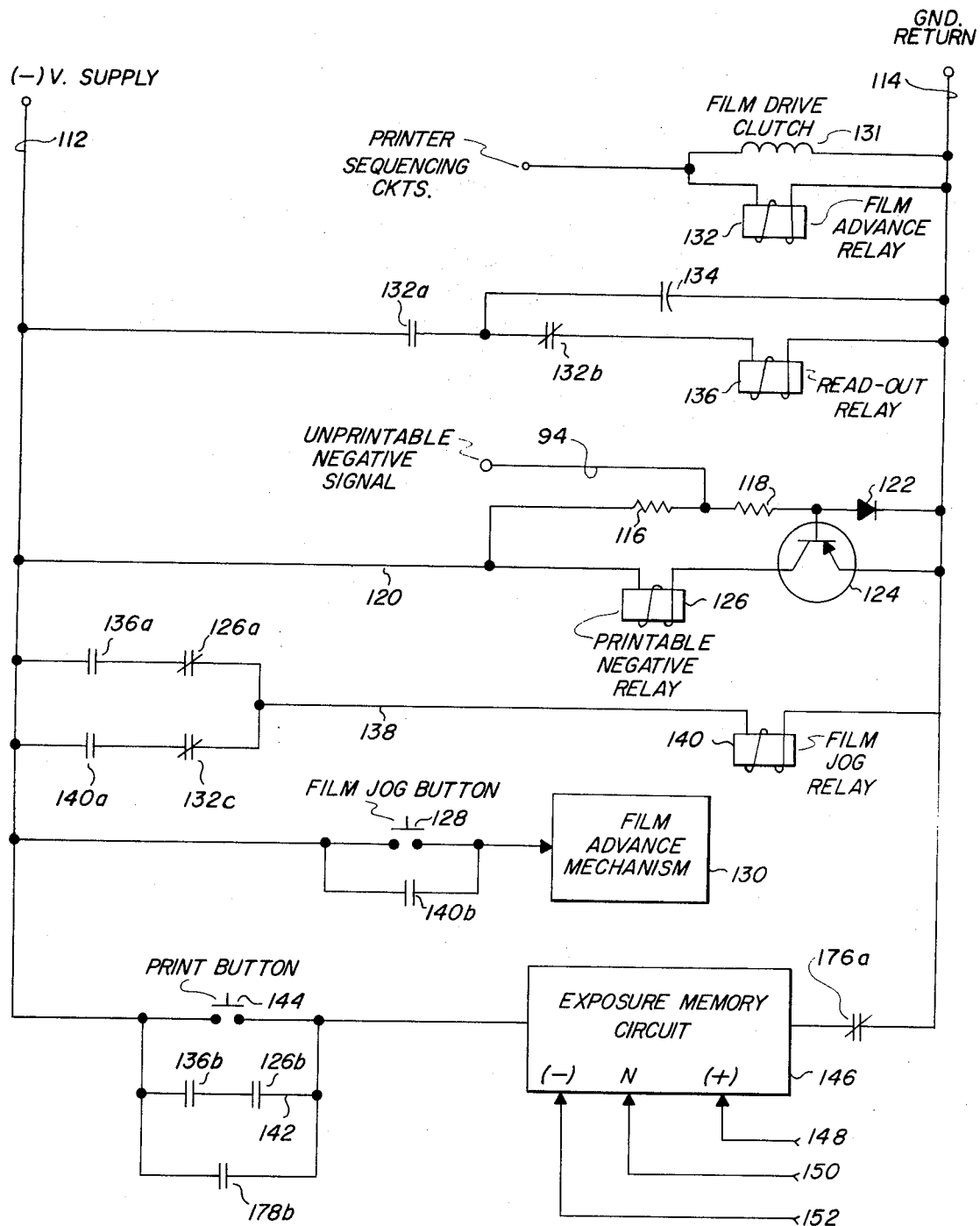
FIG. 3 is a schematic illustration of an electrical circuit for automatically advancing an unprintable negative through the printing station of a photographic printer.

The common output terminal 94 of the unprintable negative detection circuit of FIG. 2 corresponds to point 94 of FIG. 3. FIG. 3 is a schematic illustration of the printer sequencing circuits of a photographic printer including the feature of an automatic unprintable negative advance circuit employed in the practice of the present invention. All of the elements of the circuit of FIG. 3 are electrically connected in parallel between a conductor 112 connected to a −V supply and a ground return conductor 114. Each element will be described in terms of its operation in conjunction with the elements of FIGS. 1 and 2. The common output terminal 94 of the unprintable negative detection circuit of FIG. 2 is connected at the junction of two resistors 116 and 118 which are connected by conductor 120 and diode 122 between the common lines 112 and 114. The base electrode of a transistor 124 is connected to the junction between the resistor 118 and the anode of diode 122. The emitter of transistor 124 is connected to common conductor 114, and the collector of transistor 124 is connected to one terminal of a PRINTABLE NEGATIVE relay 126, the other terminal of which is connected to the conductor 120. Normally, PRINTABLE NEGATIVE relay 126 is energized through the continuous conduction of transistor 124 which is biased on by resistor 116. However, when a positive unprintable negative signal is generated by the unprintable negative detector circuit of FIG. 2, the transistor 124 is rendered nonconductive, and the PRINTABLE NEGATIVE relay 126 is deenergized.

Referring now to the operation of the circuit of FIG. 3, the filmstrip 10 of FIG. 1 is advanced through the printing station 14 by depressing the FILM JOG button 128 which energized the film advance mechanism 130 and disengages the film drive clutch 131 of a conventional printer, such as the Model 2620 printer. As the negative frame under consideration advances to the negative examination station, the FILM ADVANCE relay 132 is energized through printer sequencing circuits of the printer which causes the normally open relay contacts 132a to close and the normally closed relay contacts 132b and 132c to open. When the normally open relay contacts 132a close, the capacitor 134 charges to the negative voltage supply −V. At the end of the advance of the negative filmstrip, the film drive clutch 131 engages, normally open relay contacts 132a reopen and normally closed relay contacts 132b and 132c reclose. Capacitor 134 discharges through normally closed relay contacts 132b, and READ OUT relay 136. When READ OUT relay 136 is energized, normally open relay contacts 136a and 136b are closed. Since, in the absence of an unprintable negative signal, PRINTABLE NEGATIVE relay 126 is energized, normally closed relay contacts 126a are open and normally open relay contacts 126b are closed.

Since normally open relay contacts 136a are closed but normally closed relay contacts 126a are open, no current is allowed to flow in conductor 138, and FILM JOG relay 140 remains deenergized. However, since normally open relay contacts 126b are closed, the closure of normally open relay contacts 136b closes an energization circuit 142 across the PRINT button 144 of the printer, and the exposure memory circuit 146 of a conventional printer, such as the aforementioned Model 2620 printer, is connected to the supply voltage −V. Upon the energization of the exposure memory circuit 146, the exposure memory receives and stores a subject classification input signal on one of the three subject classification input terminals 148, 150 and 152 described in connection with FIG. 5. After storage of the subject classification input signal, the exposure memory circuit 146 advances the negative frame from the negative examination station into the printing station 14 of the photographic printer and initiates an exposure. Upon the advancement of the negative filmstrip, the film advance relay 132 is again energized, and the cycle explained hereinabove repeats for so long as an unprintable negative signal is not generated by the unprintable negative detector circuit of FIG. 2.

When, however, an unprintable negative signal is generated at terminal 94, the transistor 124 is reverse-biased and ceases to conduct current, and relay 126 is deenergized. When relay 126 is deenergized, normally closed relay contacts 126a remain closed, and normally open relay contacts 126b remain open. The sequence of operation differs to the extent that when READ OUT relay 136 is energized by the discharge of capacitor 134 after the cessation of film advance and the movement of the unprintable negative frame into the printing station 14, normally-open relay contacts 136a close and complete the circuit from the common conductor 112 through the normally closed relay contacts 126a, conductor 138, FILM JOG relay 140 and common conductor 114, thus energizing FILM JOG relay 140.

While READ OUT relay 136 is still energized, FILM JOG relay 140 becomes energized as described above, and normally open relay contacts 140a are closed, thus insuring that the FILM JOG relay 140 remains energized after normally open relay contacts 136a reopen upon the complete discharge of capacitor 134. The energization of FILM JOG relay 140 also closes normally open relay contacts 140b which bypass the FILM JOG button 128 to conduct current to the film advance mechanism 130. The film advance mechanism 130 advances the negative frame found to be unprintable through the printing station 14 of the printer. While the negative filmstrip is advancing, film advance relay 132 is energized, and normally closed relay contacts 132c reopen to deenergize FILM JOG relay 140. After the film advance is completed, film advance relay 132 deenergizes and READ OUT relay 136 becomes energized again upon the discharge of capacitor 134. If, again, the negative is found to be unprintable this cycle repeats until a printable negative is detected. For as long as no printable photographic negatives are detected, the normally open relay contacts 126b will remain open to prevent the energization of the exposure memory circuit 146 and the exposure of the negative in the printing station.

In the event that all of the negative frames of a particular customer's order are found to be unprintable by the unprintable negative detector of FIG. 2, it is still necessary to make at least one print in order that order sort and customer identification marks can be placed upon the print to keep successive customer order prints correlated with the customer order negatives. Normally the order sort mark is concurrently printed on the edge of the paper during the exposure of the first printable negative frame of each negative filmstrip. The splice detection circuit of FIG. 4 accomplishes this function and also prevents the erroneous printing of the spliced area of the negative filmstrip of FIG. 1.

Figure 4:
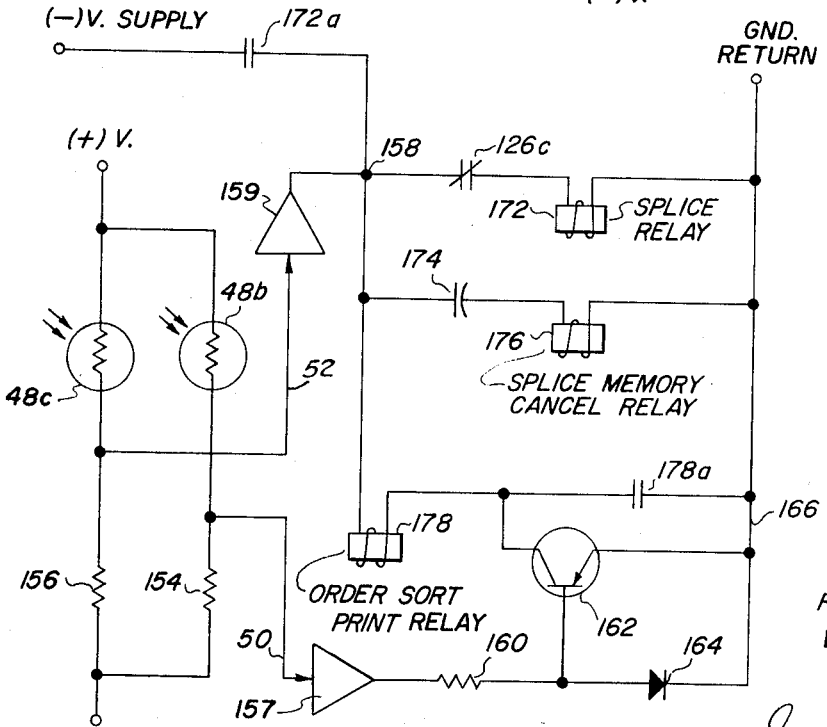
FIG. 4 is a schematic illustration of an electrical circuit for detecting splices connecting negative filmstrips.

Referring now to FIG. 4, there is shown a splice detection circuit incorporating the first place detecting photosensitive device 48b and the second splice detecting photosensitive device 48c. The splice detecting photosensitive devices 48b and 48c are connected in series relation with resistors 154 and 156, respectively, and connected in parallel between a positive voltage source +V and a negative voltage source −V. The output conductors 50 and 52 are connected to the resistor 160 and the common point 158 of the splice detection circuits, respectively, through the splice detector amplifiers 157 and 159. The resistor 160 is connected to the base electrode of a transistor 162, and a clamp diode 164 connects the base electrode of the transistor 162 to the common conductor 166 of the ground return.

The common point 158 is connected by normally closed PRINTABLE NEGATIVE relay contacts 126c to a terminal of SPLICE relay 172, the other terminal of which is connected to the common conductor 166. Connected between the common point 158 and the supply conductor are the normally open relay contacts 172a. Also connected between the common point 158 and the common conductor 166 are the series connected capacitor 174 and SPLICE MEMORY CANCEL relay 176, and ORDER SORT PRINT relay 178 is connected between the common point 158 and the collector of transistor 162. Normally open relay contacts 178a are also connected to the collector of transistor 162 and to the common conductor 166. A further set of normally open relay contacts 178b are connected across the PRINT button 144 of FIG. 3.

Referring now to the operation of the splice detector circuit of FIG. 4, it will be recalled from the discussion of FIG. 1 that the splice detecting photosensitive devices 48b and 48c were normally rendered conductive by predetermined wavelengths of light, which for example may be infrared radiation emitted by the first and second light sources 16 and 18 and transmitted by the negative filmstrip 10. Thus, as shown in the circuit of FIG. 4, when the splice detecting photosensitive devices 48b and 48c are rendered conductive, the voltage signals supplied by the splice detector amplifiers 157 and 159 to the base of transistor 162 and the common terminal 158, respectively, are positive, and no current flows through the relays 172, 176 or 178. However, the splice detecting photosensitive devices 48b and 48c cease to conduct current when the splice 46 of FIG. 1 passes between them and the light sources 16 and 18.

A frame with a splice applied will be detected by the unprintable negative detector as a printable negative since it is too narrow to cover all of the chambers of the housing 20. It is necessary therefore to cancel the normal print signal which would be generated, as described hereinbefore, by the circuit of FIG. 3. This cancellation is accomplished as the splice 46 advances over the splice detecting photosensitive device 48c. The sudden change in the polarity of the voltage signal from positive to negative on conductor 158 is capacity coupled by the capacitor 174 to the SPLICE MEMORY CANCEL relay 176 which is energized thereby. The momentary energization of the SPLICE MEMORY CANCEL relay 176 opens the normally-closed relay contacts 176a to disconnect the exposure memory circuit 146 of FIG. 3 from the ground return conductor 114. As a result no exposure is initiated by the exposure memory circuit 146 after the film stops.

In the event that no printable negative exists in a customer's order, a print must be made of a frame between splices in order to keep each customer's order separate. The SPLICE relay 172 is also energized during the period that the SPLICE MEMORY CANCEL relay 176 is energized. The SPLICE relay 172, when energized, closes the normally open relay contacts 172a in order to energize itself after the splice 46 moves past the splice detecting photosensitive device 48c. Splice relay 172 will remain energized until a printable negative is detected whereupon relay 126 of FIG. 3 is energized, and normally closed relay contacts 126c are open. However, if a second splice 46 is detected by the first splice detecting photosensitive device 48b before a printable negative has released SPLICE relay 172, normally open relay contacts 172a will remain closed. Upon the detection of a second splice 46 by the first splice detecting photosensitive device 48b, the output signal to resistor 160 abruptly changes from a positive voltage to a negative voltage. The negative voltage signal is transmitted by resistor 160 to the base of transistor 162 which is rendered conductive thereby. Upon the conduction of transistor 162, the ORDER SORT PRINT relay 178 is energized. The ORDER SORT PRINT relay 178 closes normally open relay contacts 178a to energize itself upon the continued movement of the second splice 46.

Referring back to FIG. 3, the normally open relay contacts 178b of the ORDER SORT PRINT relay 178 are closed, and a print is made by the energization of the exposure memory circuit 146 upon the advance of the last unprintable negative of the customer order into the printing station 14 of the photographic printer. Simultaneously, the exposure memory circuit 146 provides an order sort mark on the print in order to keep successive customer print orders separate.

Thus apparatus has been shown for detecting unprintable photographic negatives and advancing such unprintable photographic negatives through a photographic printer without printing them, and further apparatus has been shown that responds to the situation where all negative frames of a customer's order are unprintable for making at least one print therefrom in order to keep subsequent customer print orders separate.

Figure 5:
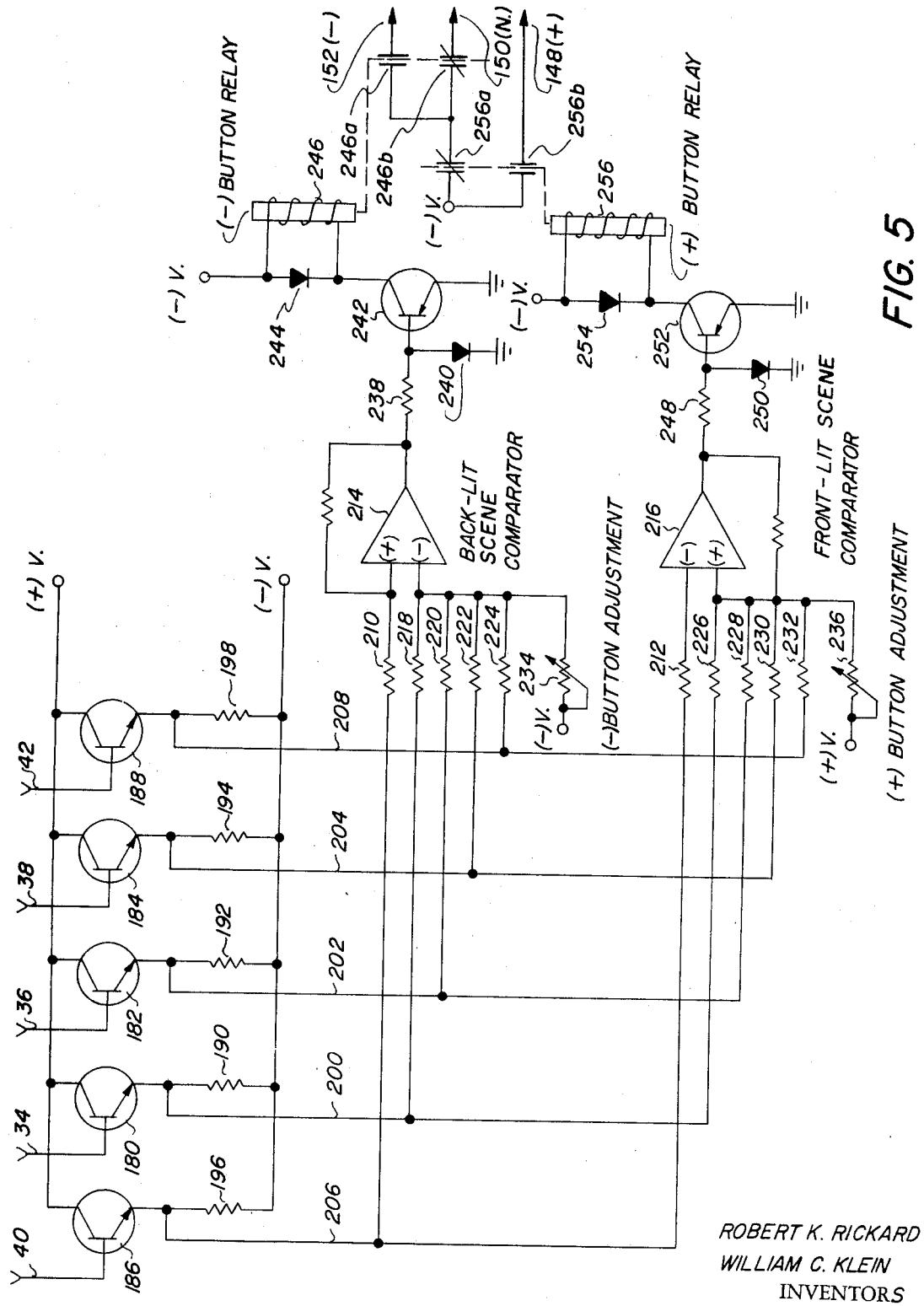
FIG. 5 is a schematic illustration of an electrical circuit for classifying a printable negative.

Referring now to FIG. 5 there is shown a further circuit that is responsive to a predetermined comparison of the negative transmittances of the five areas 22a, 24a, 26a, 28a and 30a of the negative frame 32 for detecting abnormal density variations in the negative and providing classification correction signals for printing subject failure negatives. As noted hereinbefore, subject failure negatives usually fall into two categories, that is negatives carry back-lit scenes or flash-lit scenes. These two categories may be recognized by an abnormally high negative density in the upper peripheral (sky) area or the central and the lower peripheral (flash subject) areas, respectively, of the negative. The abnormal density of a back-lit negative is compensated for during printing by shortening the total exposure time that would normally be provided by the LATD exposure control system. Conversely, the abnormal density of a flash-lit negative is compensated for by lengthening the total exposure time of the negative provided by the LATD exposure control system. Normally the operator of a printer examines the negative to be printed and classifies it as a normal or subject failure negative, and he presses the appropriate classification button provided on the console of the printer. The depression of the classification button introduces the corresponding correction factor into the LATD monitoring circuitry of the printer. It has been found desirable to automatically classify the negative and to correct for abnormal density variations in the negative. This has been accomplished, as described in the aforementioned commonly assigned, copending U.S. application, Ser. No. 67,331 by separately measuring the negative densities in the upper peripheral area, the lower peripheral area and the central area of a negative and combining these densities in a predetermined manner in order to produce the appropriate correction factor.

Referring now to FIG. 5 there is shown a negative classification circuit for use with the photosensitive devices 22b, 24b, 26b, 28b and 30b of FIGS. 1 and 2. The conductors 34, 36, 38, 40 and 42 are connected to the base electrodes of respective transistor 180, 182, 184, 186 and 188, respectively, the collector electrodes of which are commonly connected to a positive voltage source +V and the emitters of which are commonly connected through respective resistors 190, 192, 194, 196 and 198 to a negative voltage source −V. Output conductors 200, 202, 204, 206 and 208 are respectively connected to the emitter terminals of transistors 180, 182, 184, 186 and 188.

Thus the transistors 180, 182, 184, 186 and 188 operate as the emitter-followers that produce an output signal on the respective output conductors that correspond in amplitude and polarity to the positive voltage signal having an amplitude falling within the range of +V to −V developed on the input conductors 34, 36, 38, 40 and 42, respectively. These input voltages are developed in the same manner as described in the discussion of the operation of the photosensitive devices 22b, 24b, 26b, 28b and 30b of FIG. 2.

The output conductor 206 is connected by resistors 210 and 212 to the positive input terminal of differential amplifier 214 and the negative input terminal of differential amplifier 216. The output conductors 200, 202, 204 and 208 are connected in summing relation through resistors 218, 220, 222 and 224 to the negative input terminal of differential amplifier 214 and in summing relation to the positive input terminal of differential amplifier 216 through resistors 226, 228, 230 and 232. The negative input terminal of differential amplifier 214 is also connected to a negative voltage source −V through a variable resistor 324 that constitutes the (−) BUTTON adjustment. Similarly the positive input terminal of differential amplifier 216 is connected to a positive voltage source +V to a variable resistor 236 that constitutes the (+) BUTTON adjustment. The (−) Button adjustment and (+) BUTTON adjustments are provided so that the sensitivity of the classification circuit may be adjusted to the point at which the maximum number of acceptable prints are produced by the classification correction circuit.

The output terminal of the differential amplifier 214 is coupled by resistor 238 and diode 240 to the base electrode of switching transistor 242. The emitter electrode of switching transistor 242 is grounded, and the collector electrode is coupled through (−) BUTTON relay 246 to a negative voltage source −V. A diode 244 is connected across the coil of relay 246.

Similarly the output terminal of differential amplifiers 216 is coupled by a resistor 248 and diode 250 to the base electrode of transistor 252. The emitter electrode of transistor 252 is connected to ground potential, and the collector electrode is connected by (+) BUTTON relay 256 to a negative voltage source −V. A diode 254 is connected across the coil of relay 256.

Associated with the (−) BUTTON relay 246 are normally open relay contacts 246a that connect (when closed by energization of (−) BUTTON relay 246) a negative voltage source −V through the normally closed contacts 256a to the (−) BUTTON input conductor 152. Associated with the (+) BUTTON relay 256 are the normally open relay contacts 256b that connect (when closed by energization of (−) BUTTON relay 256) the negative voltage source −V to the (+) BUTTON input conductor 148. The normally closed relay contacts 246b and 256a are series connected between the negative voltage source −V nd the normal (N) BUTTON input conductor 150. The (+) BUTTON input conductor 148, the (N) BUTTON input conductor 150 and the (−) BUTTON input conductor 152 are connected to the +, N and − input terminals of the exposure memory circuit 146 of FIG. 3. In the practice of the invention, these relay contacts may be connected in the manner shown in FIG. 5 across the (+) BUTTON, (N) BUTTON and (−) BUTTON contacts on the console of a photographic printer.

Referring now to the operation of the negative classification circuit of FIG. 5, it will be noted that normally the transistors 242 and 252 are nonconductive and the (−) BUTTON relay 246 and the (+) BUTTON relay 256 are not energized. Therefore, the negative voltage source −V is normally connected to the (N) BUTTON input conductor 150 by the normally closed relay contacts 246b and 256a.

However, when the voltage developed at the positive input terminal of the differential amplifier 214 is more negative than the average of the voltages applied at the negative input terminal, a negative voltage is developed at the output terminal of the differential amplifier 214 and the transistor 242 is rendered conductive. The conduction of transistor 242 energizes the (−) BUTTON relay 246, causing the normally open relay contacts 246a to close and the normally closed relay contacts 246b to open. Therefore, the negative voltage −V is diverted to the (−) BUTTON conductor 152.

Similarly, a negative output signal is developed at the output terminal of differential amplifier 216 when the average of the voltage signals at the positive input terminal of the differential amplifier 216 is less negative than the voltage signal applied at the negative input terminal. The transistor 252 is rendered conductive by the negative output signal thus energizing the (+) BUTTON relay 256. The energization of the (+) BUTTON relay 256 closes the normally open relay contacts 256b, thus energizing the (+) BUTTON input conductor 148.

Referring back to FIG. 1 it will be noted that the area 28a of the negative 32 constitutes a portion of the upper peripheral area of the negative scene and the photosensitive device 28b is responsive to the transmissivity of this upper area of the negative scene. Similarly the other photosensitive devices respond to the transmissivity of the other respective areas of the scene carried by the negative 32. When the transmissivity of the area 28a of the negative 32 is a certain amount lower than the average transmissivities of the remaining areas of the negative 32, it can be assumed that the scene carried by the negative 32 is back-lit, for example, by a bright sky. The output signal developed by the photosensitive device 28b in the circuit of FIG. 3 is applied by conductor 40 to the base electrode of transistor 186 of FIG. 5. When as stated, the transmissivity of the area 28a is relatively low, the voltage developed on conductor 40 is relatively large and negative. The emitter-follower transistor 186 responds to this voltage signal to develop a negative voltage signal on the output conductor 206 that is applied to the plus input terminal of the differential amplifier 214 and the minus input terminal of the differential amplifier 216. Similarly the signal developed by the remaining photosensitive devices on the output conductors 200, 202, 204 and 208 are averaged at the negative input terminal of the differential amplifier 214 and the positive input terminal of the differential amplifier 216. When the magnitude of the signal developed on the output conductor 206 is more negative than the average magnitude of the signals developed on the output conductors 200, 202, 204 and 208 and the (−) BUTTON adjustment, the differential amplifier 214 produces a negative output signal that, as described hereinbefore, renders transistor 242 conductive and energizes (−) BUTTON relay 246. In this manner, the negative is classified as a back-lit scene, and a proper negative correction factor is introduced into the LATD measurement system to shorten the total exposure time of the negative.

Similarly when the average transmissivity of the areas 22a, 24a, 26a and 30a is a certain amount less than the transmissivity of the area 28a the negative probably is carrying a front-lit scene, such as a flash picture. This imbalance is characterized by the fact that the average of the output signals developed on the output conductors 200, 202, 204 and 208 be less than the magnitude of the signal developed on the output conductor 206, and the differential amplifier 216 responds to this imbalance to produce a negative output signal. The negative output signal, as stated hereinbefore, renders transistor 252 conductive and energizes the (+) BUTTON relay 256 which energizes the (+) BUTTON conductor 148. Thus the total exposure time for a front-lit scene is increased by the addition of a positive correction factor to the LATD exposure control system.

The circuit of FIG. 5 constitutes but one example of the combinations of particular areas of the negative 32 that is effective to determine that the scene carried by the negative is a normally illuminated scene, a back-lit scene or a front-lit scene and to provide necessary correction for the classified scene. It will be apparent that other combinations of predetermined areas of the negative 32 may be made in order to practice the present invention. For example, the housing 20 of FIG. 1 may be provided with any number of chambers and respective photosensitive devices that are responsive to the transmissivity of respective areas of the negative 32. It is also apparent that the solid state photosensitive array described in the aforementioned commonly assigned, copending U.S. application, Ser. No. 67,331 may be substituted for the photosensitive devices 22a, 24a, 26a, 28a and 30a of the present invention. Appropriate circuit modifications may be made to the negative classification circuit of FIG. 5 and the unprintable negative detection circuit of FIG. 2.

The invention has been described in detail with particular reference to the preferred embodiment thereof, but it will be understood that variations and modifications can be effected within the spirit and scope of the invention.

We claim:

1. Apparatus for performing an operation relative to a section of an elongated medium located in an operating station, said apparatus comprising:
    a. means for detecting a first predetermined condition of each section of the medium and for generating a first signal in response to the detected first condition;
    b. means for detecting a second predetermined condition of each section of the medium and for generating a second signal in response to the detected second condition;
    c. means for repetitively advancing each section of the elongated medium to the operating station;
    d. means responsive to the advancement of each section to the operating station and to the generation of the first signal for performing the operation relative to the section of the elongated medium advanced to the operating station;
    e. means responsive to the advancement of each section of the elongated medium to the operating station and to the presence of the second signal for continuing the advancement of the section through the operating station; and
    f. means responsive to the advancement of all sections of said elongated medium through the operating station in the presence of the second signal for performing the operation relative to at least one section of the elongated medium.

2. The apparatus of claim 1 wherein the elongated medium comprises a plurality of strips having leading, intermediate and trailing sections, wherein the strips are attached together at each end of the leading and trailing sections of adjacent strips, and wherein said means responsive to the advancement of the elongated medium in the presence of the second signal further comprises means responsive to the advancement of the leading and all intermediate sections of the strip through the operating station in the presence of the second signal for advancing the trailing section of the strip into the operating station and performing the operation relative to the trailing section of the strip.

3. The apparatus of claim 1 wherein the elongated medium comprises a plurality of strips having leading, intermediate and trailing sections, wherein the strips are attached together at each end of the leading and trailing sections of adjacent strips, and wherein said means responsive to the advancement of the elongated medium in the presence of the second signal further comprises:
    a. means for detecting the attached ends of the strips and generating third signals in response thereto; and
    b. means responsive to the advancement of the leading and all intermediate sections of the strip through the operating station in the presence of the second signal and responsive to the third signal for advancing the trailing section of the strip into the operating station and performing the operation relative to the trailing section of the strip.

4. Apparatus for printing at least one original of a photographic original filmstrip comprising originals that are unsuitable for printing by exposure to a source of radiation, said apparatus comprising:
    a. first means for detecting the radiation transmittance level of each photographic original and for generating an unprintable original signal in response to a predetermined radiation transmittance level that indicates that the original is unsuitable for producing an acceptable print; and
    b. second means responsive to the unprintable original signal being generated by said first means with respect to every photographic original of the photographic original filmstrip for printing at least one photographic original unsuitable for producing an acceptable print.

5. In a photographic printer, wherein each original of the photographic original filmstrip may be printed in an exposure station of the printer, apparatus for printing at least one original in a photographic original filmstrip comprising originals that are unsuitable for producing an acceptable print, said apparatus comprising:
    a. means for detecting printable originals of a photographic original filmstrip that are suitable for producing an acceptable print and printing the detected printable originals in the exposure station of the printer;

b. means for detecting originals of a photographic original filmstrip that are unsuitable for producing an acceptable print and for preventing the printing of the detected unsuitable originals in the exposure station of the printer; and c. means responsive to the absence of a printable original in a photographic original filmstrip for printing at least one original that is unsuitable for producing an acceptable print.

6. In a photographic printer, wherein developed photographic original filmstrips are attached together at leading and trailing ends thereof and each original of the photographic original filmstrips may be successively printed on photosensitive print material in the exposure station of the printer, apparatus for printing at least one original in a photographic original filmstrip comprising originals detected as unsuitable for producing an acceptable print, said apparatus comprising:

a. means for detecting a first condition of each original indicating that such original is suitable for producing an acceptable print and for generating a first signal in response to the detected first condition;

b. means for detecting a second condition of each original indicating that such original is unsuitable for producing an acceptable print and for generating a second signal in response to the detected second condition;

c. means for successively advancing each original of the photographic original filmstrips to the exposure station of the printer;

d. means responsive to the advancement of each original to the exposure station and to the generation of the first signal with respect to the advanced original for printing the advanced original;

e. means responsive to the advancement of each original to the exposure station and to the generation of the second signal with respect to the advanced original for preventing the printing of the original that is unsuitable for producing an acceptable print and for activating said advancing means; and f. means responsive to the advancement of every original in a photographic original filmstrip through the exposure station of the printer in the absence of the first signal for printing at least one original that is unsuitable for producing an acceptable print.

7. The apparatus of claim 6 wherein:

a. the originals that are unsuitable for producing an acceptable print comprise over-exposed or fogged or under-exposed or blank photographic originals;

b. the photographic original filmstrips comprise leading, intermediate and trailing originals; and c. said means for printing at least one original that is unsuitable for producing an acceptable pring further comprises:

1. means responsive to the advancement of the attached leading ends of successive photographic original filmstrips to the exposure station for detecting the attached leading ends and generating a third signal in response thereto;

2. means for detecting the attached trailing ends of successive photographic original filmstrips as the trailing original of a respective photographic original filmstrip is advanced to the exposure station and generating a fourth signal in response thereto;

3. means disposable in first and second states in response to the first and third signals, respectively; and 4. means responsive to the fourth signal and the disposition of said second means in said second state for printing the trailing original advanced to the exposure station.

8. In a photographic printer, wherein developed photographic original filmstrips comprising leading, intermediate and trailing originals are attached together at leading and trailing ends thereof by splices at each end adjacent to leading and trailing originals of respective filmstrips, apparatus for printing, in an exposure station of the printer, at least one original in a filmstrip wherein all of the leading, intermediate and trailing, originals are unsuitable for producing acceptable prints, said apparatus comprising:

a. means for detecting a first condition of each original indicating that such original is suitable for producing an acceptable print and for generating a first signal in response to the detected first condition;

b. means for detecting a second condition of each original indicating that such original is unsuitable for producing an acceptable print and for generating a second signal in response to the detected second condition;

c. means for advancing each original and the splices attaching successive filmstrips to the exposure station of the printer;

d. means located with respect to the exposure station of the printer for detecting splices upon the advancement of the trailing original into the printing station and for generating a third signal in response to the detected splice;

e. means responsive to the advancement of a splice into the exposure station and to the third signal for advancing the spliced ends of successive photographic original filmstrips, through the exposure station, without printing the splice;

f. means responsive to the advancement of each original into the exposure station and to the first signal for printing the advanced original;

g. means responsive to the advancement of each original into the exposure station and to the second signal for preventing the printing of the advanced original; and h. means responsive to the advancement of the leading and all intermediate originals through the exposure station of the printer in the presence of the second signal and responsive to the third signal for printing the trailing original in the exposure station.

9. The apparatus of claim 6 wherein:

a. the originals that are unsuitable for producing an acceptable print comprise over-exposed or fogged or under-exposed or blank photographic originals;

b. the photographic original filmstrips comprise leading, intermediate and trailing originals; and c. said means for printing at least one original that is unsuitable for producing an acceptable print further comprises:
1. means responsive to the advancement of the attached leading ends of successive photographic original filmstrips to the exposure station for detecting the attached leading ends and generating a third signal in response thereto;
2. means for detecting the attached trailing ends of successive photographic original filmstrips as the trailing original of a respective photographic original filmstrip is advanced to the exposure station and generating a fourth signal in response thereto;
3. means disposable in first and second states in response to the first and third signals, respectively; and
4. means responsive to the fourth signal and the disposition of said second means in said second state for printing the trailing original advanced to the exposure station.

10. A method of photographic printing, wherein photographic original filmstrips, consisting of leading, intermediate and trailing originals, are attached together by splices and advanced through an exposure station, said method comprising the steps of:
   a. directing radiation through each photographic original;
   b. sensing the intensity of the radiation transmitted by each original;
   c. comparing the sensed radiation intensity level transmitted by the original with reference radiation intensity levels;
   d. advancing originals exhibiting radiation transmittance levels that are excessively high or excessively low in comparison to the reference radiation intensity levels through the exposure station of the photographic printer, without printing such originals;
   e. advancing to the exposure station and printing originals exhibiting radiation transmittance levels that are acceptable in comparison with the reference radiation intensity levels;
   f. detecting splices attaching photographic original filmstrips upon the advancement of the splices into the exposure station and producing a first signal in response thereto;
   g. applying the first signal to a switching element normally disposed in a first state and disposable in a second state in response to the first signal;
   h. producing a second signal in response to the printing of printable, leading, intermediate and trailing originals;
   i. applying the second signal to said switching element to dispose said switching element in said normal first state;
   j. detecting splices attaching photographic original filmstrips upon the advancement of the trailing photographic original into the exposure station and generating a third signal in response thereto; and
   k. printing the trailing original in response to the second state of said switching element and the third signal so that at least one original in a photographic original filmstrip consisting of unprintable originals is printed.

11. A method of printing each original of a photographic original filmstrip, said method comprising the steps of:
   a. detecting a predetermined condition of each photographic original to determine if the photographic original is suitable for producing an acceptable print;
   b. printing photographic originals determined to be suitable for producing an acceptable print; and
   c. printing at least one photographic original when every photographic original of the photographic original filmstrip is determined to be unsuitable for producing an acceptable print.

12. In a photographic printing process wherein developed photographic original filmstrips, consisting of leading, intermediate and trailing originals, are attached by splices and intermittently advanced through an exposure station of a photographic printer, a method of advancing under-exposed or blank and over-exposed or fogged, photographic originals through said exposure station, said method comprising the steps of:
   a. controlling the exposure of printable photographic originals in said exposure station in accordance with the exposure level of the photographic originals;
   b. advancing, without printing under-exposed or blank and over-exposed or fogged photographic originals through said exposure station of said photographic printer; and
   c. exposing at least one photographic original frame in a photographic original filmstrip comprising under-exposed or blank and over-exposed or fogged photographic originals.

13. In the method of claim 12 the step of exposing the trailing photographic original in a photographic original filmstrip comprising under-exposed or blank and over-exposed or fogged photographic originals.

14. In a photographic printer, apparatus for preventing the exposure of a photographic original exhibiting an excessively high or excessively low transmittance to radiation, said apparatus comprising:
   a. means for directing radiation through said photographic original;
   b. first and second photosensitive means responsive to the intensity of radiation transmitted by first and second areas of said photographic original for producing first and second signals;
   c. means for providing a first reference signal having a maximum level indicative of the maximum transmittance of a photographic original that can be successfully printed;
   d. means for providing a second reference signal having a minimum level indicative of the minimum transmittance of a photographic original that can be successfully printed;
   e. means responsive to the first reference signal and the first and second signals for producing a first unprintable original signal when the levels of the first and second signals exceed the maximum level of the first reference signal;
   f. means responsive to the second reference signal and the first and second signals for producing a second unprintable original signal when said minimum level of the second reference signal exceeds the level of the first and second signals; and g. means responsive to the first and second unprintable original signals for preventing the printing of said photographic original.

15. The apparatus of claim 14 wherein said first reference signal providing means further comprises means for varying the maximum level of the first reference signal and said second reference signal providing means further comprises means for varying the minimum level of the second reference signal.

16. The apparatus of claim 14 wherein said first and second photosensitive means further comprises:
  a. first and second photosensitive elements each having first and second terminals, said first terminals being commonly connected to a first voltage source, first and second resistance elements, each respectively connecting said second terminal to a second voltage source, each of said photosensitive elements responding to radiation transmitted by each respective area of said photographic original to produce the first signal and the second signal at the respective second terminals of said first and second photosensitive elements;
  b. first means connected to said second terminals of said first and second photosensitive elements and responsive to the first and second signals for producing a first output signal having a level representative of the maximum level of the first and second signals; and
  c. second means connected to said second terminals of said first and second elements and responsive to the first and second signals for producing a second output signal having a level representative of the minimum level of the first and second signals.

17. The apparatus of claim 16 wherein said first unprintable original signal producing means is responsive to the first output signal and the first reference signal and wherein said second unprintable original signal producing means is responsive to the second output signal and the second reference signal.

18. In a photographic printer, wherein successive photographic original filmstrips are attached together by splices, apparatus for preventing the exposure of said splices and of unprintable photographic originals exhibiting an excessively high or excessively low transmittance to radiation, said apparatus comprising:
  a. means for directing radiation through the photographic originals;
  b. first and second photosensitive means responsive to the intensity of radiation transmitted by first and second respective areas of said photographic original for producing first and second signals having levels dependent upon the radiation intensities transmitted by said first and second areas;
  c. means for providing a first reference signal having a maximum level indicative of the maximum transmittance of a photographic original that can be successfully printed;
  d. means for providing a second reference signal having a minimum level indicative of the minimum transmittance of a photographic original that can be successfully printed;
  e. means responsive to the first reference signal and the first and second signals for producing a first unprintable original signal when the levels of the first and second signals exceed the maximum level of the first reference signal;
  f. means responsive to the second reference signal and the first and second signals for producing a second unprintable original signal when said minimum level of the second reference signal exceeds the levels of the first and second signals;
  g. means responsive to the first and second unprintable original signal for preventing the printing of said photographic original;
  h. third photosensitive means located with respect to said radiation transmitting means and said photographic original filmstrip for producing a splice signal when a splice attaching successive photographic original filmstrips prevents the transmission of radiation through said photographic original filmstrip and upon said second photosensitive means; and
  i. means responsive to said splice signal for preventing the printing of the splice areas of said attached successive photographic original filmstrips.

19. The apparatus of claim 18 wherein said third photosensitive means is responsive to a predetermined radiation spectrum of the radiation transmitting means and wherein said splice comprises means for preventing the transmission of said predetermined spectrum of radiation to said third radiation sensitive means.

20. In a photographic printer, apparatus for controlling the exposure of a photographic original exhibiting an imbalance in density modulation between first and second areas of the photographic original and for preventing the exposure of a photographic original exhibiting an excessively high or excessively low transmittance to radiation in both the first and the second areas, said apparatus comprising:
  a. means for directing radiation through said photographic original;
  b. first and second photosensitive means responsive to the intensity of radiation transmitted by first and second respective areas of said photographic original for producing first and second signals having levels dependent upon the density modulation of each respective area of said photographic original;
  c. means for producing a first reference signal having a maximum level indicative of the maximum transmittance of a photographic original that can be successfully printed;
  d. means for producing a second reference signal having a minimum level indicative of the minimum transmittance of a photographic original that can be successfully printed;
  e. means responsive to the first reference signal and the first and second signals for producing a first unprintable original signal when the levels of both the first and the second signal exceed the maximum level of the first reference signal;
  f. means responsive to the second reference signal and the first and second signals for producing a second unprintable original signal when said minimum level of the second reference signal exceeds the levels of both the first and the second signal;
  g. means responsive to the first and second unprintable original signal for preventing the printing of said photographic original; and
  h. means responsive to the absence of the first and second unprintable original signals and responsive to an imbalance in the amplitudes of the first and second signals for producing an exposure correction signal.

21. The apparatus of claim 10 wherein the exposure correction signal producing means further comprises:
   a. first means for producing a first correction signal when the level of the first signal exceeds the level of the second signal;
   b. second means for producing a second correction signal when the level of the second signal exceeds the level of the first signal; and
   c. third means for producing a third correction signal when the levels of the first and second signals are approximately equal.

22. In a photographic printer, apparatus for providing an exposure correction signal for a photographic original exhibiting an imbalance in density modulation in first and second areas of the photographic original, said apparatus comprising:
   a. means for directing radiation through said photographic original;
   b. first and second photosensitive means responsive to the intensity of radiation transmitted by first and second respective areas of said photographic original for producing first and second signals each having a level dependent upon the density modulation of each respective area of said photographic original;
   c. means responsive to the amplitude of said first and said second signal for providing an unprintable photographic original signal when said levels indicate that both the first and second areas of the photographic original are unprintable;
   d. means responsive to the unprintable photographic original signal for preventing the exposure of said photographic original in said photographic printer; and
   e. means operative in the absence of an unprintable photographic original signal and responsive to the levels of said first and second signals for providing an exposure correction signal dependent upon the degree of imbalance in the levels of the first and second signals.

23. The apparatus of claim 22 wherein said exposure correction signal providing means further comprises:
   a. first means for producing a first exposure correction signal when the level of the first signal exceeds the level of the second signal;
   b. second means for producing a second exposure correction signal when the level of the second signal exceeds the level of the first signal; and
   c. third means for producing a third exposure correction signal when the levels of the first and second signals are approximately equal.

24. A method of photographic printing, wherein photographic original filmstrips are attached together by splices and advanced through an exposure station, said method comprising the steps of:
   a. directing radiation through first and second areas of each photographic original;
   b. sensing the intensity of the radiation transmitted by said first and second areas of the photographic original;
   c. comparing the sensed radiation intensity levels transmitted by said first and second areas with reference radiation intensity levels;
   d. advancing originals exhibiting radiation transmittance levels in the first and second areas of the photographic original frames that are excessively high or excessively low in comparison to the reference radiation intensity levels through the exposure station of the photographic printer, without printing such original frames;
   e. detecting splices attaching photographic original filmstrips;
   f. advancing detected splices through said exposure station of said photographic printer without printing spliced areas;
   g. comparing the radiation intensity levels of the radiation transmitted by the first and second areas and providing an exposure correction signal in response to the degree of difference between the radiation intensity levels;
   h. advancing printable photographic originals into said exposure station of said photographic printer; and
   i. controlling the exposure of said photographic original frame in accordance with the exposure correction signal.

* * * * *

UNITED STATES PATENT OFFICE
CERTIFICATE OF CORRECTION

Patent No. 3,690,765　　　　　　　　Dated  October 27, 1972

Inventor(s)  Robert K. Rickard and William C. Klein

It is certified that error appears in the above-identified patent and that said Letters Patent are hereby corrected as shown below:

Front page, Column 2, last line, after the abstract, "8" (Drawing Figures) should read --5-- (Drawing Figures.

Column 17, line 61, "pring" should be --print--.

Column 23, line 4, "10" should be --20--.

Signed and sealed this 24th day of April 1973.

(SEAL)
Attest:

EDWARD M. FLETCHER, JR.　　　　　ROBERT GOTTSCHALK
Attesting Officer　　　　　　　　Commissioner of Patents